J. C. LOCKE.

Assignor to J. J. COWELL.

Trunk.

No. 8,520. Reissued Dec. 10, 1878.

Witnesses.
J. A. Shumway.
H. A. Nelson.

John C. Locke
Inventor.
By atty.
Thos. D. Cook

N. PETERS, PHOTO-LITHOGRAPHER, WASHINGTON, D.C.

UNITED STATES PATENT OFFICE

JOHN C. LOCKE, OF ROCHESTER, NEW YORK, ASSIGNOR TO JOHN J. COWELL, OF NEWARK, NEW JERSEY.

IMPROVEMENT IN TRUNKS.

Specification forming part of Letters Patent No. 112,937, dated March 21, 1871; Reissue No. 8,520, dated December 10, 1878; application filed November 7, 1878.

*To all whom it may concern:*

Be it known that I, JOHN C. LOCKE, of Rochester, in the county of Monroe and State of New York, have invented a new Improvement in Traveling-Trunks; and I do hereby declare the following, when taken in connection with the accompanying drawings and the letters of reference marked thereon, to be a full, clear, and exact description of the same, and which said drawings constitute part of this specification, and represent, in—

Figure 3:
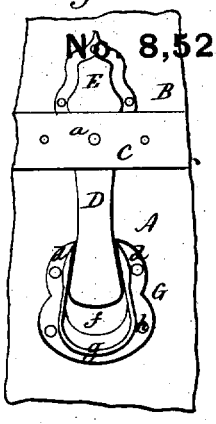
Figure 1:
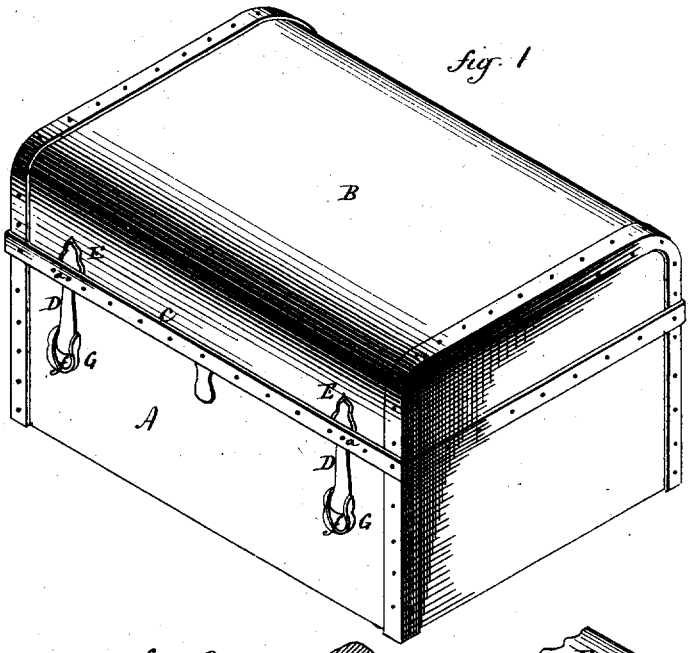
Figure 4:
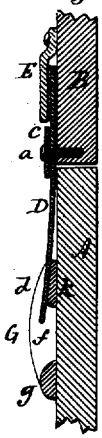
Figure 2:
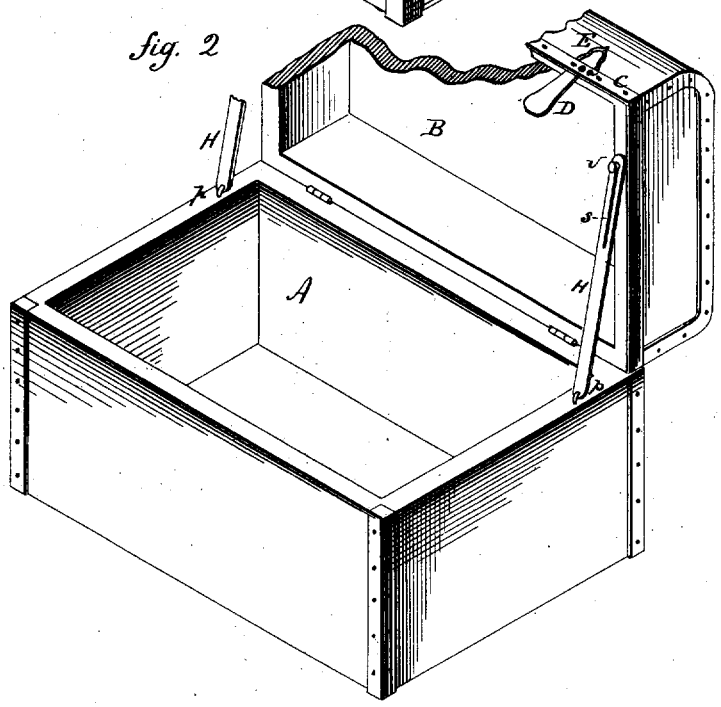
Figure 5:
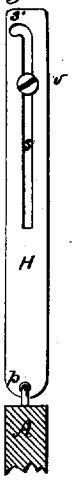

Figure 1, perspective view of the trunk closed; Fig. 2, similar view of the same open; Figs. 3 and 4, views of the strap arrangement; Fig. 5, view of the stay arrangement.

This invention relates to an improvement in devices for attachment to trunk covers and bodies, the object of which is, first, to dispense with the usual straps and buckles, and apply as a substitute therefor a spring device independent of the lock, which will operate automatically as the cover is closed, and also a metallic connection in place of the usual flexible stays attached to support the cover when open; and consists in the construction, as hereinafter described, and more particularly recited in the claims.

A is the body of the trunk, B the cover, C the valance, of ordinary construction, the cover being hinged to the trunk, and provided with the usual lock. D D are two springs or catching devices attached to the outer side of one part (here represented as the cover) by plates E E, and pivoted thereto, as at *a a*, so as to have a slight degree of lateral play, which enables the catching devices to engage and interlock with the catches should the cover be racked or not come down in the exact vertical line with the catches. G G are the catches attached to the other part of the trunk in such a position as to engage the spring catching devices when the cover comes down, the extreme end of the said catching devices being constructed so as to engage the said catches provided for them.

As here shown, these catches are peculiar in their construction. Their upper part is formed with two projecting lugs, *d d*, expanding from each other as they extend down. The end of the strap is of correspondingly expanding shape.

The lugs start substantially flush at the top and gradually increase in projection as they go downward till they pass the extent which will be occupied by the spring catching device. They then continue around the bottom of the catch, leaving an open space, *f*, under the end of the catching device, so that the finger may be inserted therein to draw the catching device forward out of engagement with the said catch. The projecting bottom and sides *g h* of the catch serve as a guard to shield and prevent injury to the end of the strap, the effect being to cause any opposing object to ride over and above the guarded catching device. The catch is provided with a bearing, *k*, to receive the catching device when it drops into place.

The operation is as follows: When the cover is closed the lower and expanded end of the catching device rides over the lugs *d d* of the catch till the cover is fully closed; then the catching device coincides with the catch and springs into place, and remains locked. The action is thus automatic and requires no attention in closing the trunk, and the cover is held firmly down without any loose action, such as is experienced in the use of leather straps.

The whole tensile strength of the spring-catching device is also secured, as there is no break or slot in them, and the trunk will give way before they can draw out. The advantage is great over a hasp having an eye that shuts into a slot of the trunk, as in that case the whole strain comes upon the eye, which soon tears out. It is also much better than if a slot were cut in the strap itself, shutting over a pin, as in that case the strap would be weakened. I have contemplated these and other modifications, but the method described is far preferable to any that I know of.

Instead of the ordinary flexible stays to hold the cover up I employ the following arrangement: H H are thin metallic bands of a width less than the thickness of the boards from which the trunk is made. The lower ends of these bands are jointed or hinged at

*p p* to the top of the end pieces of the trunk-body. The upper portions of the bands have a longitudinal slot, *s*, with a bend, *s'*, at the top. A screw or pin, *v*, passes through this slot into the end piece of the cover. The bands thus lie flatwise between the ends of the body and cover.

The operation is as follows: When the cover is raised the screw *v* slides along in the slot *s* till the cover is vertical, when it drops into offset *s'*, and the band then becomes a stiffener or stay to hold the cover up. When the cover is let down again the band is drawn sidewise to relieve the screw from the offset, and then falls down between the edges of the trunk, where it is perfectly covered and shielded from injury. This is a great advantage over the ordinary webbing used, or the jointed elbow arrangement that has been employed in some cases, which folds up as the cover closes.

It will be noticed that both the spring catching devices and the stays are self-adjusting—that is, when the catching devices strike down they lock or engage automatically with the catches, and the cover cannot rise again till they are disengaged by the fingers, and when the cover rises the screw catches in the offset of the slot, and the cover cannot fall till the stays are purposely disengaged again.

I do not claim a hasp for holding the cover to the body; neither do I claim, broadly, metallic arms to serve as stays; but What I do claim, and desire to secure by Letters Patent, is—

1. A trunk-fastening consisting of a catch and of a plate provided with a spring catching device, one to be applied to the cover and the other to the body of the trunk independent of the trunk-lock, and adapted to automatically engage with each other in closing the trunk.

2. A trunk-fastening consisting of a catch and of a plate provided with a spring catching device, one to be applied to the cover and the other to the body of a trunk independent of the trunk-lock, and adapted to automatically engage with each other in closing the trunk, said catch constructed with a cavity for the insertion of the finger to disengage said catching device, substantially as described.

3. The pivoted or hinged stays H H, provided with the slots *s s'*, when arranged to lie flat between the ends of the body and cover when the trunk is closed, as herein shown and described, for the purpose specified.

JOHN C. LOCKE.

Witnesses:
R. F. OSGOOD,
FREDERICK VOSE.